US005530957A

United States Patent [19]

Koenig

[11] Patent Number: 5,530,957
[45] Date of Patent: Jun. 25, 1996

[54] STORING TREES IN NAVIGABLE FORM

[75] Inventor: Andrew R. Koenig, Gillette, N.J.

[73] Assignee: AT&T Corp., Murray Hill, N.J.

[21] Appl. No.: 927,087

[22] Filed: Aug. 7, 1992

[51] Int. Cl.⁶ .................................................. G06F 17/30
[52] U.S. Cl. .................. 395/600; 364/251.6; 364/960.5; 364/DIG. 1; 395/700
[58] Field of Search ..................... 395/600, 200, 395/700, 400, 425, 159, 160, 2; 364/DIG. 1, 251.6, 960.5; 341/51, 65, 67, 79, 87

[56] References Cited

U.S. PATENT DOCUMENTS

| | | | |
|---|---|---|---|
| 4,868,743 | 9/1989 | Nishio | 364/200 |
| 4,945,475 | 7/1990 | Bruffey et al. | 364/DIG. 1 |
| 5,153,591 | 10/1992 | Clark | 341/51 |
| 5,202,986 | 4/1993 | Nickel | 395/600 |
| 5,253,325 | 10/1993 | Clark | 395/2 |
| 5,257,365 | 10/1993 | Powers et al. | 395/600 |
| 5,263,160 | 11/1993 | Porter et al. | 395/600 |
| 5,276,874 | 1/1994 | Thomson | 395/600 |
| 5,295,261 | 7/1990 | Simonetti | 395/600 |
| 5,297,284 | 4/1991 | Jones et al. | 395/700 |
| 5,303,367 | 12/1990 | Leenstra, Sr. et al. | 395/600 |
| 5,307,486 | 4/1994 | Nakamigawa | 395/600 |

OTHER PUBLICATIONS

Practical Dictionary Management for Hardware Data Compression, Bunton et al., Communications of the ACM, V35, n1, p. 95(11), Jan., 1992.

Primary Examiner—Thomas G. Black
Assistant Examiner—Hosain T. Alam
Attorney, Agent, or Firm—Gordon E. Nelson

[57] ABSTRACT

A compact representation of a tree data structure and techniques for navigating the compact representation. The compact representation is a list. Each element of the list represents a node of the tree and the list is organized according to a preorder traversal of the tree. Each list element contains only the index of a data dictionary entry for the kind of item represented by the node corresponding to the list element. The navigation techniques permit the location of the list element for the sibling of the node corresponding to the given list element, the location of the list element for that node's parent, and in the case of a parent node, the location of the list element for any child of the parent. The navigation techniques work by finding the list elements for subtrees. The subtrees are found by techniques based on the fact that the number of children of all of the nodes in a subtree minus the number of nodes in the subtree always equals −1. The number of children of a given node is determined by a valence function which takes the index of the data dictionary entry as its argument.

11 Claims, 2 Drawing Sheets

STORING TREES IN NAVIGABLE FORM

BACKGROUND OF THE INVENTION

1. Field of the Invention

The invention relates generally to computer and data processing systems and more specifically to the storage of tree data structures in the memory of a computer system.

2. Description of the Prior Art

Trees are frequently used in computer systems to represent relationships between items of data. For example, a compiler may have to process a source file for a program which includes the following:

```
int a, b, product;
    . . .
product := a * b;
    . . .
```

The statement product:=a*b; instructs the compiler to generate executable code which assigns the product of the variables a and b to the variable product. While the compiler is working on the source code, it represents the statement as a tree. The tree is shown in FIG. 1. Tree 101 is made up of nodes which are indicated by circles in FIG. 1. A given node may have descendant nodes which are lower in the tree than the given node and ancestor nodes which are higher. Thus, the ancestors of node 111 are nodes 107 and 103, and the descendants of node 103 are nodes 105, 107, 109, and 111. The immediate ancestor of a node is its parent, and the node's immediate descendants are its children. Children of the same parent are siblings. Thus, node 107 has node 103 as its parent, nodes 109 and 111 as its children, and node 105 as its sibling. The topmost node in the tree, in this case, node 103, is termed the root node of the tree, and nodes without children are termed leaf nodes. In tree 101, nodes 105, 109, and 111 are leaf nodes. A subtree is a node and all of its descendants. Thus, nodes 107, 109, and 111 are a subtree of tree 101 and node 109 is a subtree of both tree 101 and the subtree made up of nodes 107, 109, and 111. The subtree whose root is a given node is said to be rooted in that node. Accordingly, subtree 107, 109, and 111 is rooted in node 107.

The portion of source code represented by tree 101 includes operators, which indicate operations to be performed on values, and operands which indicate the values upon which the operations are to be performed. The operators are * indicating multiplication, and: =, indicating assignment. As for the operands, a and b are the operands of *, and the operands of: =are product and a * b. In tree 101, the subtrees representing an operator's operands are rooted in the children of the node representing the operator. Thus, node 103 representing the: =operator has as its children node 105, in which the subtree representing the left-hand operand is rooted, and node 107, in which the subtree representing the right-hand operand is rooted.

Operations which programs perform on trees include traversal, in which, beginning at the root, each node of the tree is visited in some order; locating the parent of a given node; locating a specific child of a given node; and moving to the next node to be visited in the course of a traversal. Two important types of traversals are preorder traversals and postorder traversals. In a preorder traversal of tree 101, the nodes are visited in the order 103, 105, 107, 109, 111. In a postorder traversal, the nodes are visited in the order 105, 109, 111, 107, 103. As for the other operations, the operation of locating the parent of node 111 would locate node 107; the operation of locating the second child of node 103 would locate node 107; and in the case of a preorder traversal, the operation of advancing to the next node performed on node 107 would locate node 109.

In order to facilitate the above operations, a tree is usually represented in a computer system as a collection of node data structures. FIG. 2 shows such a representation 201 of tree 101. Each node of tree 101 has a corresponding node data structure 203; each node data structure 203 contains node data 205, which represents the node's data. For instance, node data 205 in node data structure 203 representing node 103 indicates at least that the node represents the: =operator. Each node data structure 203 further has pointers 206. A pointer is value which is an address in memory. Parent pointer (PP) 207 in a given node data structure 203 has as its value the address of (points to) node data structure 203 representing the parent node of the node represented by the given node data structure 203. Similarly, each of the child pointers (CP) 209 points to a node data structure 203 representing one of the children of the given node. The order of the child pointers is the same as the left-to-right order of the children of the node represented by node data structure 203. Thus, as seen in tree representation 201, parent pointer 207 of node data structure 203 representing node 107 points to node data structure 203 representing node 103 and the child pointers 209(1) and 209(2) point to node data structures 203 representing nodes 109 and 111 respectively. As is apparent from the foregoing, all of the operations which need to be performed on tree 101 can be easily performed by following the pointers in tree representation 201.

There are two drawbacks of tree representation 201. The first is that the trees required by many applications (such as programming environments for languages such as C++) are very large. Large trees pose a number of difficulties for a memory system. In simple computer systems, the physical memory system may not be large enough to accommodate large trees; in computer systems having virtual memory, there may be no problems with physical memory, but the virtual address space may be too small; even where that is not a problem, performing operations on a large tree may result in many page faults and a corresponding degradation of performance. The second is that the pointers 206 in the nodes have meaning only in the memory system in which tree representation 201 was created; it is consequently not possible to copy tree representation 201 from one computer system to another computer system.

The prior art has attempted to deal with both drawbacks. One approach has been to reduce the size of node data 205 to a minimum. Generally speaking, the data represented by node data 205 appears over and over again in a program. For example, most programs will use operators such as: =and * repeatedly, and programs also generally use variables such as a, b, and product repeatedly. That being the case, the prior art has made an entry in a data dictionary in memory for each unique item of node data and has replaced node data 205 with the index of the entry for the item of node data in the data dictionary, thereby reducing node data structure 203 to the necessary parent and child pointers and the index into the node data structure. However, the trees in some applications have grown so large that even such reduced node data structures 203 still take up too much memory. Further, these reduced data structures 203 have grown steadily larger as the size of address spaces, and therefore of the pointers used in them, has increased.

Another approach has been to develop representations of trees which require fewer pointers. Such representations store the node data structures sequentially and use the order in which the node data structures are stored to replace some or all of the pointers. Examples of such representations may be found in D. E. Knuth, *Fundamental Algorithms*, Section 2.3.3, p. 347. One of the representations in this section, termed by Knuth *postorder with degrees* (page 350, bottom) eliminates pointers completely. Instead, the sequential order in which the node data structures are stored is that of a postorder traversal of the tree and each node data structure includes the degree of the node, that is, the number of children which the node has. Other examples of such representations may be found in R. C. Read, *Graph Theory and Computing*.

The usefulness of these "pointerless" representations of trees has been greatly limited by the fact that the art has not known how to do the kinds of general navigation operations previously described in such representations. For this reason, the art has used these representations only for long-term storage of trees and has reconstituted them into representations using pointers whenever navigation was required. Reconstituting the trees requires time, and of course the reconstituted representations have all of the size problems alluded to above. Consequently, the pointerless representations have been useful only to reduce the amount of disk space required for storage of trees and to make it possible to move trees from one computer system to another. It is an object of the present invention to overcome these disadvantages and provide pointerless representations of trees which can be navigated and techniques for navigating them.

SUMMARY OF THE INVENTION

In one aspect, the invention is apparatus for storing a tree data structure in a memory system. The tree structure is made up of one or more nodes and each node represents one of a plurality of items. The apparatus includes

- a data dictionary in the memory system which includes one data dictionary entry for each of the items and which permits determination of the number of children which a node representing an item has; and
- a list in the memory system which has one or more list entries, the list entries being ordered according to a traversal of the tree structure and each list entry representing a single one of the nodes and including a value which may be used both to locate the entry in the data dictionary for the item represented by the node and to derive the number of children of the node represented by the entry.

In another aspect, the invention is a method for detecting a subtree in a sequential representation of a tree. The sequential representation includes an element for each node which contains a value from which a valence value for the node can be derived.

The valence value is the number of children belonging to the node corresponding to the element and the sequence of the elements is that of a traversal of the nodes of the tree. The method includes the steps of

- for a given subsequence of the elements,
  determining the number of elements in the subsequence;
  determining the sum of the valence values for the elements in the subsequence; and
  subtracting the sum of the valence values from the number of elements, the subsequence corresponding to a subtree when the result of the subtraction is −1.

Further aspects include tree navigation operations based on the detection of subtrees. The foregoing and other objects, aspects and advantages of the invention will be apparent to one of ordinary skill in the art who peruses the following Drawing and Detailed Description, wherein:

Figure 1:
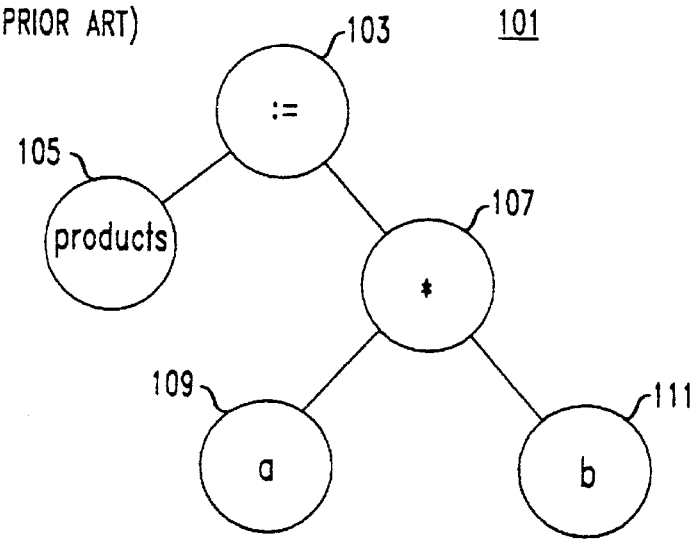
FIG. 1 is an example tree.
Figure 2:
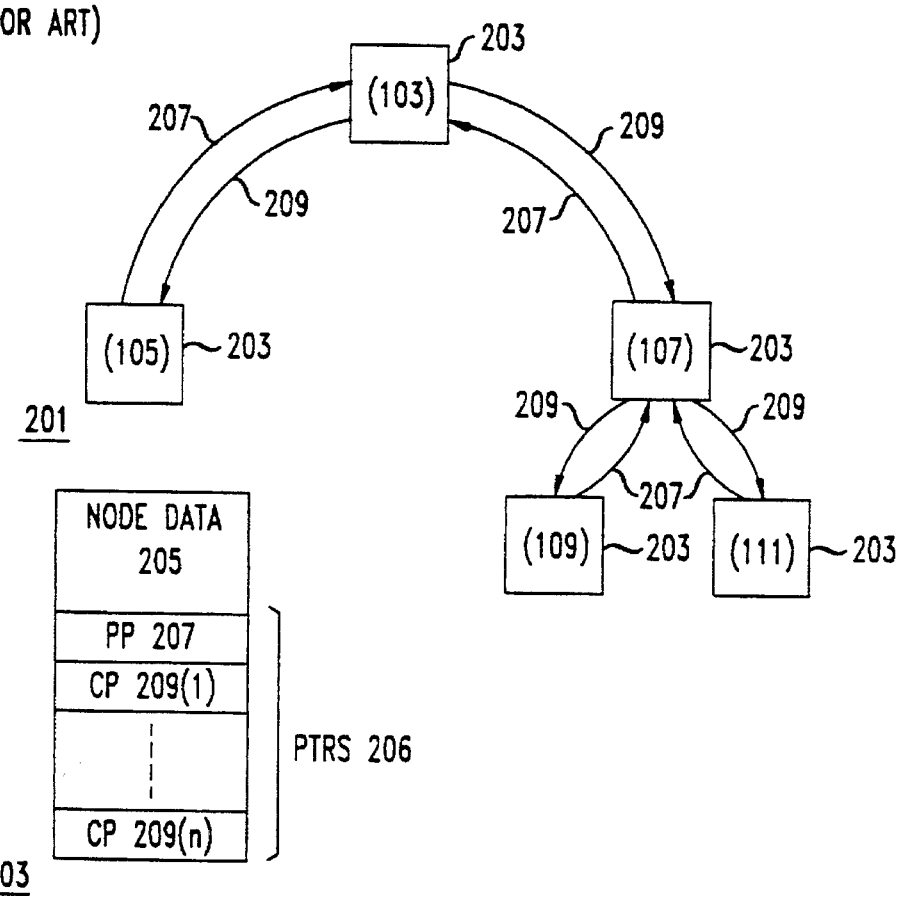
FIG. 2 is a prior-art representation of the example tree.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following discussion of a preferred embodiment of the tree representation and navigation techniques will first describe a preferred embodiment of the tree representation and will then describe preferred embodiments of the navigation techniques.

Figure 3:
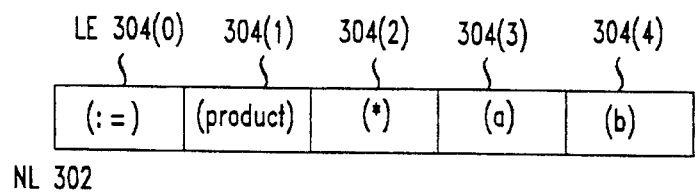
FIG. 3 is a representation of the example tree which employs the techniques of the invention.
Figure 3:
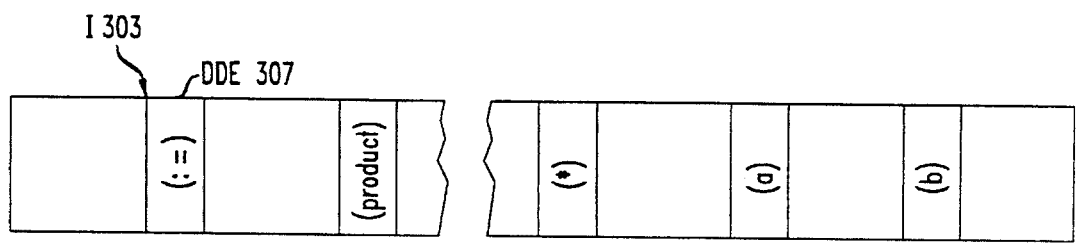
Figure 3:
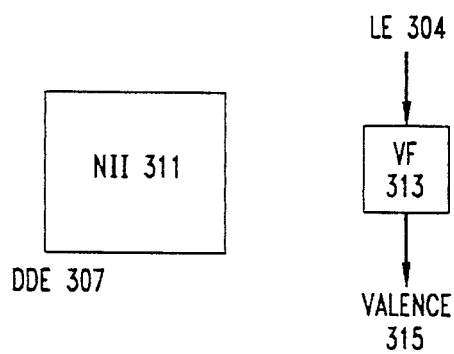

Representing a Tree as a Shrub: FIG. 3

The pointerless data structure used to represent a tree is termed herein a shrub. FIG. 3 shows a preferred embodiment of a shrub 301 representing example tree 101. Shrub 301 has two main components: node list (NL) 302 and data dictionary (DD) 305. Data dictionary 305 contains one entry 307 for each distinct item such as an operator, a function name, a constant, or a variable name which appears in the program for which tree 101 is being made. Thus, FIG. 3 shows entries for: =, product, *, a, and b. Each entry has associated with it an index (I) 303, which may be used to locate the entry in data dictionary 305. Node list 302 is a list of entries (LE) 304. Each list entry 304 represents a node of the tree. In the preferred embodiment, the sequence of entries in node list 302 is that of a preorder traversal of tree 101, that is: entry 304(0) represents node 103, entry 304(1) represents node 105, and so forth. The value of each list entry 304 is the index 303 of the data dictionary entry 307 for the item represented by the node to which list entry 304 corresponds. Thus, index 303 in entry 304(0) is that of DUDE 307 for the :=operator.

Each data dictionary entry 307 contains node item information 311. Node item information 311 is information about an item in the program. The contents of node item information will of course depend on the item. They will always include the type of item and whatever other information about the item which the program using the shrub requires. An important property of data dictionary entry 307 for an item in a preferred embodiment is that the valence of a node representing the item may be inferred from the item's data dictionary entry 307. The valence of a node is the number of children which the node has, and is thus equivalent to the node's degree.

Such inferences are possible in the preferred embodiment because it employs shrubs to represent programs written in the C++ language. In that language, functions and operators may have varying numbers of operands, but a given invocation of the function or use of the operator has a fixed number of operands, and consequently, the node representing the invocation or use has a fixed number of children. In the data dictionary, there are as many different entries 307 for the function or operator as the different numbers of operands with which it is used, permitting inference of the valence from the data dictionary entry 307 for the function or operator. Put in other words, there is a function which, given a list entry 304, returns the valence value for the node represented by the list entry. Such a valence function is shown at 313 in FIG. 3. The implementation of such a function will of course vary. The valence could simply be stored in node information 311, and the function could retrieve it from there. In other implementations, the function could use a table which mapped indices 303 onto valences. While the preferred embodiment employs valences in a list ordered according to a preorder traversal of the nodes, the Knuth reference shows that the use of valences is not limited to such lists.

As can be seen from FIG. 3, the storage required for a shrub is simply the amount of memory required for node list 302 plus the amount of memory required for data dictionary 305 and for any tables employed by valence function 313. Since data dictionary 305 is generally required by the application for other purposes, the additional storage which the application requires to represent the tree is usually only the storage for node list 302. The size of node list 302 is of course a function of the size of list entries 304, and their size is in turn a function of the size of the indices required for data dictionary 305. That, finally, is a function of the number of indices required. Generally speaking, the number of indices required is small compared with the size of an address space, and consequently, a list entry 304 will be generally considerably smaller than any of the pointers 206 of a representation such as representation 201. Experiments with the preferred embodiment have shown that pointerless representations of trees for C++ programs which are made using the techniques shown in shrub 301 are ⅛th the size of the tree representations generally used to represent C++ programs.

Navigation of Shrubs 301

A preorder traversal of the tree 101 represented by shrub 301 is of course simple: the program using shrub 101 need only work through node list 302 in sequential order. Indeed, because node list 302 is already sequentially ordered, such a traversal is faster than it is with pointer representation 201. Similarly, if a program is at a given list entry 304, all that is needed to find the previous or following node in a preorder traversal is to move to the preceding or following list entry 304.

More complicated navigation of shrub 301 is based on two facts about the adjusted sum of a tree or any subtree. The adjusted sum is the number of children, that is, the valence, of each node in the tree or subtree minus the number of nodes in the tree or subtree. The two facts are the following:

• The adjusted sum of a tree or subtree is always −1; and
• if you accumulate the adjusted sum of the nodes represented by a sequence of list entries 302 while scanning the nodes from left to right, the adjusted sum will be negative if and only if you have scanned a complete subtree, at which point it will be −1.

The following examples illustrate the first fact: Any leaf node has a valence of 0 and the number of nodes in the subtree made up of the leaf node is 1, so the adjusted sum is −1; similarly, the subtree made up of nodes 107, 109, and 111 has valence values of 0 for nodes 109 and 111 and 2 for node 107 and there are three nodes in the subtree, so the adjusted sum is −1, as it is for the entire tree 101 (total valences of 4, number of nodes 5).

The second fact is useful for navigating the tree. For example, the algorithm for moving from a given node to its next sibling to the right (for example, from node 105 to node 107 in tree 201) is based on the principle that the sibling and any descendants make up a subtree, and consequently, the list entry 304 for the sibling will have been reached when the adjusted sum of the nodes represented by the list entries following the list entry 304 for the given node reaches −1. The C language code for the algorithm follows.

int count=0;
do count +=valence (*p++)−1;
while (count >=0);

count stores the adjusted sum; p is a pointer to the list entry 304 for the given node; valence is of course the valence function. It takes the value of a list entry 304 (the value is represented by * p) and returns the valence of the node represented by the list entry 304. Applied to shrub 301, the algorithm works as follows: at the start of the algorithm, p points to list entry 304(1) representing the given node 105; the do count +=valence (*p++)−1; statement first obtains the valence of the node represented by list entry 304(1), that is, node 105, whose valence is 0. After obtaining the valence, it increments p, which consequently now points to list entry 304(2), which is the entry for node 107. 1 is subtracted from the valence value, 0, and count is set to the result, which is −1. Since count is not >0, the algorithm terminates, leaving p pointing to node 105's next sibling to the right, node 107. Of course, if there were list entries 304 for the nodes of a subtree between the list entry for the given node and the list entry for its next right sibling, the algorithm would increment p across the subtree until it pointed to the list entry 304 for the next right sibling.

The algorithm for locating a child n of a given node is to simply move to the next entry in node list 302, which will be the entry for the given node's leftmost child, and then use the algorithm for moving to the next sibling until the desired child node is reached. The C code is the following:

```
if (n > 0 && n <= valence(*p)) {
    int i;
    p++;
    for (i = 1; i < n; i++) {
        do count += valence(*p++) − 1;
        while (count >= 0);
    }
}
```

The if statement checks to make sure that the value of n makes sense, i.e., that it's greater than 0 and no greater than the number of children belonging to the current node. Next, p is incremented, so that it points to the next list entry 304 in node list 302; finally, the for loop uses the algorithm for moving to the next sibling to move to the list entry 304 for the desired sibling. For example, if the code is used to locate the second child of node 103, namely node 107, it begins with p pointing to LE 304(0); when p is incremented, it points to LE 304(1); the for loop is executed once, and at the end of it, p points to LE 304(2), as described above.

Moving up from a given node to its parent takes advantage of the fact that all of the list entries 304 between the list entry 304 for the given node and the list entry 304 for the given node's parent belong to subtrees which have siblings of the given node as their root nodes. Each of these subtrees has an adjusted sum of −1, and consequently, the list entry 304 for the parent node is reached when the valence of the node represented by that list entry 304 minus the sum of the adjusted sums is 0 or more. The C code for the algorithm follows:

```
int sum = 0;
do {
    sum += valence (*--p) - 1;
} while (sum < 0);
```

If the given node is 105, the algorithm works as follows: At the start of the algorithm, p is pointing to list entry 304(1); it is decremented, so that it points to list entry 304(0), which is the list entry for node 103; valence returns 2, the valence for node 102, and sum is equal to 1, whereupon the algorithm terminates, leaving p pointing to list entry 304(0) for node 103.

Even though the sequence of list entries 304 in node list 302 corresponds to a preorder traversal of the tree represented by node list 302, it is not difficult to do a postorder traversal of the tree using a shrub 301. To do so, one keeps a stack of items representing the nodes on the path from the root to the current node. Each item includes a count of the children of the node represented by the item which have not yet been visited and a pointer to the node it represents. Each time a list entry 304 representing a leaf is visited, the item at the top of the stack represents the leaf's parent, and the count of the children in that item is decremented by 1; when the count is zero, the pointer at the top of the stack is followed to the list entry 304 for the parent. That list entry 304 is then visited and the item at the top of the stack is popped.

A postorder traversal of tree 101 visits the nodes in the order 105, 109, 111, 107, 103. In shrub 101, it would be done like this: the valence function shows that the node represented by LE 304(0) is not a leaf node and has two children to be visited. Consequently, an item indicating that fact is pushed onto the stack. Next, LE 304(1) is visited valence shows that it is a leaf node, so whatever action to be taken on the visit to the leaf node is performed and the number of children to be visited in the item at the top of the stack is decremented by 1. The next list entry is 304(2), and valence shows that it is a parent with two children, so another stack item is pushed onto the stack. Next comes list entry 304(3), which represents a leaf node, so the action to be taken on a visit to the leaf node is performed and the number of children to be visited in the item at the top of the stack is decremented by 1. Finally, list entry 304(3) is reached; it, too, is a leaf node, so the visit action is performed and the number of children to be visited is 0, so the item is popped from the stack, the action to be taken on visiting node 107 is performed, and the number of children in the item which is now at the top of the stack is decremented, leaving the number of children to be visited there at 0. Thereupon, the item is popped from the stack and the action to be taken on visiting node 103 is taken, finishing the postorder traversal of the tree.

Conclusion

The foregoing Detailed Description has disclosed to those of ordinary skill in the art how a representation of a tree may be made which has no pointers and requires far less space in memory than prior-art representations, how sequential representations of trees may be navigated, and how the foregoing techniques for representing and navigating trees may be combined to provide representations of trees which are both efficiently navigable and extremely compact. The Detailed Description has shown a sequential representation in which the order of the sequence was that of a preorder traversal of the tree, but sequential representations ordered according to other kinds of traversals may be used as well. The Detailed Description has further shown a tree used to represent the C++ language, but the invention is by no means restricted to such trees, but can be used for trees representing any kind of data. Further, the Detailed Description has shown how the principles disclosed herein may be used to locate siblings, children, and parents, but they may be used for other navigation operations as well. Additionally, the subtree detection method described herein may be used for any operation requiring the detection of a subtree. The Detailed Description has also shown detailed methods for navigating the representations disclosed herein. While the navigation methods and representations are the best presently known to the inventor, other implementations of the techniques disclosed herein are possible.

Because the foregoing is the case, the Detailed Description is to be regarded as being in all respects illustrative and exemplary, and not restrictive, and the scope of the inventions disclosed herein is to be determined solely by the following claims as interpreted in light of the Specification and according to the Doctrine of Equivalents.

What is claimed is:

1. Apparatus for storing a tree data structure in a memory system, the tree structure being made up of one or more nodes, each of which represents one of a plurality of items, the apparatus comprising:

a data dictionary in the memory system which includes one data dictionary entry for each of the items;

valence function means for determining the number of children which a node representing an item has; and a list in the memory system which has one or more list entries, the list entries being ordered according to a traversal of the tree structure and each list entry representing a single one of the nodes and including a value which is used both to locate the entry in the data dictionary for the item represented by the node and with the valence function means to determine the number of children of the node represented by the entry.

2. The apparatus set forth in claim 1 wherein:

the list entries are stored in a sequence of memory locations which corresponds to the sequence of the list entries.

3. The apparatus set forth in claim 2 wherein:

each list entry includes only the value.

4. The apparatus set forth in claim 1 wherein:

the sequence of the list entries is that of a preorder traversal of the tree.

5. The apparatus set forth in any of claims 1, 2, 3, or 4, wherein:

the value has substantially fewer bits than the number of bits in a pointer which specifies an address in the memory system.

6. The apparatus set forth in any of claims 1, 2, 3, or 4 further comprising:

navigation means for performing tree navigation operations on the list, the navigation means including means for detecting any subtrees of the tree data structure in a sequence of the list entries and the navigation means employing the detected subtrees to perform the tree navigation operations on the list.

7. The apparatus set forth in claim 6 wherein:

the navigation means employs the detected subtrees to locate the parent of a given node;

locate a given child of a given parent node; and locate a given sibling of a given node.

8. The apparatus set forth in claim 6 wherein:

the means for detecting any subtrees further includes means for determining the number of children of a node represented by a list entry from the value included in the list entry; and the means for detecting any subtrees employs the number of children returned by the means for determining to detect the subtrees.

9. A method for detecting a subtree of a tree in a sequential representation of the nodes of the tree, the sequential representation including an element for each node which includes a value from which a valence value can be determined, the valence value being the number of children belonging to the node corresponding to the element, and the sequence of the elements being that of a traversal of the nodes of the tree, the method comprising the steps of:

for a given subsequence of the elements, determining the number of elements in the subsequence;

determining the sum of the valence values for the elements in the subsequence; and subtracting the sum of the valence values from the number of elements, the subsequence corresponding to a subtree when the result of the subtraction is −1.

10. A method of performing tree navigation operations on a list representing a tree data structure, the list including a list entry for each node of the tree data structure and being ordered according to a traversal of the tree data structure, the method comprising the steps of:

employing a value in the list entry to determine the number of children of the node represented by the list entry employing the number of children to detect subtrees of the tree data structure; and employing the detected subtrees to perform the tree navigation operations on the list.

11. The method set forth in claim 10 wherein:

the step of employing the number of children to detect the subtrees comprises the steps of:

beginning with a starting list entry which is either the first list entry in the sequence or the first list entry following the list entries for a detected subtree, performing steps for each list entry following the starting list entry including for a current list entry, determining the number of list entries since the starting list entry;

determining the sum of the number of children of the nodes represented by the starting list entry and the following list entries through the current list entry; and subtracting the sum of the number of children from the number of list entries since the starting list entry, the list entries from the starting list entry to the current list entry corresponding to a subtree when the result of the subtraction is −1.

* * * * *